US007358485B2

(12) United States Patent
Mannino et al.

(10) Patent No.: US 7,358,485 B2
(45) Date of Patent: Apr. 15, 2008

(54) ZIRCONIA TOUGHENED ALUMINA COMPOSITION AND USE IN ION AND ELECTRON OPTICAL SYSTEMS

(75) Inventors: Rosario Mannino, Bridgeport, CT (US); Giuseppe Coppola, West Haven, CT (US)

(73) Assignee: PerkinElmer LAS, Inc., Boston, MA (US)

( * ) Notice: Subject to any disclaimer, the term of this patent is extended or adjusted under 35 U.S.C. 154(b) by 169 days.

(21) Appl. No.: 11/348,863

(22) Filed: Feb. 7, 2006

(65) Prior Publication Data

US 2006/0192109 A1    Aug. 31, 2006

Related U.S. Application Data

(60) Provisional application No. 60/650,881, filed on Feb. 8, 2005.

(51) Int. Cl.
*H01J 49/00*    (2006.01)
(52) U.S. Cl. .................................................. 250/281
(58) Field of Classification Search ................ 250/281
See application file for complete search history.

(56) References Cited

U.S. PATENT DOCUMENTS

| 2,931,852 | A | 4/1960 | Holland et al. ............. 174/111 |
| 4,316,964 | A | 2/1982 | Lange ......................... 501/105 |
| 4,542,293 | A | 9/1985 | Fenn et al. ................. 250/288 |
| 5,032,555 | A | 7/1991 | Yamanis et al. ............ 501/105 |
| 5,852,294 | A | 12/1998 | Gulcicek et al. ............ 250/292 |
| 6,140,640 | A | 10/2000 | Wittmer et al. ............. 250/288 |
| 7,144,743 | B2 * | 12/2006 | Boschetti et al. .......... 436/528 |
| 2003/0218130 | A1 * | 11/2003 | Boschetti et al. .......... 250/288 |
| 2004/0124149 | A1 | 7/2004 | Boschetti et al. .......... 210/656 |

FOREIGN PATENT DOCUMENTS

| JP | 62 103956 | 5/1987 |
| JP | 11 025903 | 1/1999 |
| WO | WO 2004/049402 | 6/2004 |

OTHER PUBLICATIONS

Wang J et al, "Zirconia—Toughened Alumina (ZTA) Ceramics", Journal of Materials Science, vol. 24 No. 10, Oct. 1, 1989, 20 pages.
M'Peko J-C et al. "Electrical Properties of Zirconia—Alumina Composites" North Holland Pub Co. vol. 156 No. 1-2, Jan. 2003, 11 pages.
International Search Report and Written Opinion of the International Searching Authority, Jul. 17, 2007, 11 pages.

* cited by examiner

*Primary Examiner*—Kiet T. Nguyen
(74) *Attorney, Agent, or Firm*—St. Onge Steward Johnston & Reens LLC

(57) ABSTRACT

An ion optical system including an ionizer for ionizing one or more compounds, the ionizer including a plurality of components, a mass separator for separating ions of the one or more compounds, the mass separator including a plurality of components, and a detector for identifying the one or more compounds, the detector including a plurality of components. At least one of the plurality of components of at least one of the ionizer, mass separator and detector includes a composition of zirconium oxide and aluminum oxide.

20 Claims, 6 Drawing Sheets

ZIRCONIA TOUGHENED ALUMINA COMPOSITION AND USE IN ION AND ELECTRON OPTICAL SYSTEMS

CROSS-REFERENCE TO RELATED APPLICATIONS

This application claims priority benefits under 35 § U.S.C. 119(e) of the U.S. Provisional Application No. 60/650,881, filed on Feb. 8, 2005, the contents of which are incorporated by reference herein in their entirety.

FIELD OF THE INVENTION

This invention relates to ion and electron optical systems. More particularly, this system relates to ion and electron optical systems comprising a Zirconia Toughened Alumina ("ZTA") composition.

BACKGROUND OF THE INVENTION

The present invention relates to ion and electron optical systems, such as mass spectrometer ("MS") systems. Mass spectrometer systems may, for example, be used to analyze the chemical composition of subject samples. Generally, such systems ionize the atoms and molecules present in a subject sample. Once ionized, the ions are transferred into a mass analysis region where they are separated, or filtered, according to their mass-to-charge ratio (m/z) to create a mass spectrum. A charged-particle detector of the mass spectrometer system then analyzes the ions in order to identify their mass and velocity distribution. From this, information useful in characterizing the chemical composition of the sample can be determined.

Ion and electron optical systems, such as mass spectrometer systems, generally require a reduced pressure environment and therefore include a vacuum system for lowering the pressure throughout. To ionize the sample, mass spectrometer systems also include an ionization source such as an electron ionizer ("EI") or chemical ionizer ("CI"). One type of mass spectrometer system, a gas chromatograph ("GC") mass spectrometer system, further includes a gas chromatograph to separate volatile and non-volatile compounds prior to providing them for ionization.

The systems generally also include a mass separator or mass analyzer. In some systems, the mass separator includes an electromagnet for deflecting ions in the beam. Depending on the mass and charge of the ions, the magnitude of deflection varies. Generally ions having a higher mass, deflect less. Species of ions present in the sample may therefore be separately studied by varying the magnetic field.

In some other systems, the mass separator includes a quadrupole mass filter consisting of four parallel rods. For example, two opposite rods may have a positive applied potential while the other two rods have a negative potential. The applied voltages affect the trajectory of ions traveling down the flight path centered between the four rods. For given voltages, only ions of a certain mass-to-charge ratio pass through the quadrupole filter and all other ions are thrown out of their original path. A mass spectrum may therefore be generated by varying the voltages.

The various components of ion and electron optical systems are subject to high temperatures, stress, and contact with any number of chemical compounds. Traditionally, ceramics have been used for various components due to their desirable chemical and electrical properties. However, the ceramics which are presently used often do not provide the necessary structural strength and are, therefore, prone to fracture damage or breakage. Often, the thermal expansion of adjacent metal components causes the ceramic components to break. This can cause misalignment, ceramic dust contamination and electrical insulation breakdown in the mass spectrometer. Other materials which are used in ion and electron optical systems have better strength capabilities, but are unstable and lose electrical insulation properties at high temperatures.

SUMMARY OF THE INVENTION

According, it is an object of the present invention to provide a composition or material for use in ion and electron optical systems.

It is also an object to provide an ion and electron optical system in which one or more components thereof comprise a composition or material which provides strength, chemical inertness, and insulation.

It is also an object to provide a method to isolate components of an ion and electron optical system.

These and other objectives are achieved by providing a ion optical system comprising an ionizer for ionizing one or more compounds, said ionizer comprising a plurality of components, a mass separator for separating ions of the one or more compounds, said mass separator comprising a plurality of components, and a detector for identifying the one or more compounds, said detector comprising a plurality of components, wherein at least one of the plurality of components of at least one of said ionizer, said mass separator and said detector comprises a composition of zirconium oxide and aluminum oxide. In embodiments, the composition comprises at least approximately 5% zirconium oxide by volume, while in other embodiments, the composition comprises at least approximately 20% zirconium oxide by volume, while in yet further embodiments, the composition comprises at least approximately 50% zirconium oxide by volume. In an embodiment, the composition comprises approximately 50% zirconium oxide by volume and approximately 50% aluminum oxide by volume. In a preferred embodiment, the composition comprises approximately 30% zirconium oxide by volume and approximately 70% aluminum oxide by volume.

Further provided is a method of isolating one or more components of ion optical system, comprising the steps of providing an ionizer for ionizing a one or more compounds, said ionizer comprising a plurality of components, providing a mass separator for separating ions of the one or more compounds, said mass separator comprising a plurality of components, providing a detector for identifying the one or more compounds, said detector comprising a plurality of components, and providing at least one isolator for at least one of the plurality of components of at least one of said ionizer, said mass separator and said detector, said isolator comprising a composition of zirconium oxide and aluminum oxide.

Other objects, features and advantages according to the present invention will become apparent from the following detailed description of certain illustrated embodiments when read in conjunction with the accompanying drawings in which the same components are identified by the same reference numerals.

DETAILED DESCRIPTION OF THE INVENTION

Figure 1:
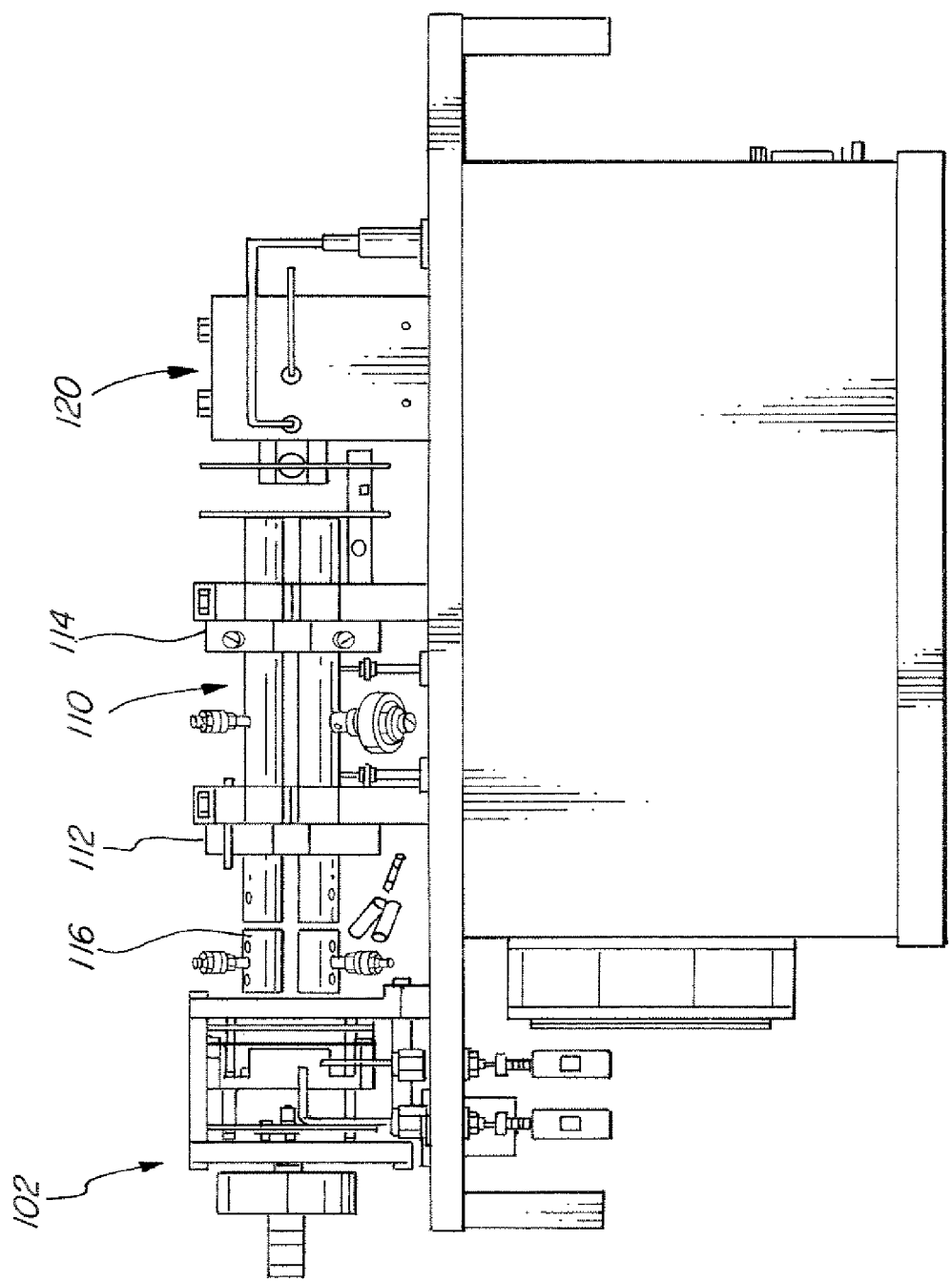
FIG. 1 is a side view of one ion optical system according to the present invention.

FIG. 1 shows an exemplary ion and electron optical system according to one embodiment of the present invention. The system may be one or more of many ion and/or electron optical systems or vacuum systems. For example, the system may be a gas chromatograph mass spectrometer system. The exemplary system shown in FIG. 1 includes a means to ionize a sample (e.g., chemical compound), or an ionizer 102. The ionizer 102 may be one or more of many ionizers, such as an electron ionizer (e.g., electron impact ionizer) and/or a chemical ionizer. In some embodiments, the ionizer 102 may include an electrospray ionizer ("ESI") or an atmospheric pressure chemical ionizer ("APCI"). Further included in the system may be a gas chromatograph and/or liquid chromatograph to separate volatile and non-volatile compounds prior to providing them for ionization.

Also shown in FIG. 1, the system may include a mass separator 110 or mass analyzer. As one of ordinary skill in the art will understand, the mass separator 110 may be one of many types of mass separators or means to separate or filter ions according to their mass-to-charge ratio (m/z). In the illustrated embodiment, the mass separator 110 is a quadrupole mass analyzer or separator having at least four quadrupoles (e.g., quadrupoles 118 shown in FIG. 2) or quads. The mass separator 110, or a portion thereof, may be supported and/or aligned by one or more supports, such as supports 112 and 114 (e.g., quad supports). The mass separator 110 may further include a pre-filter 116, e.g., having pre-filter quadrupoles 117. The pre-filter 116 may operate to improve sensitivity of the mass separator 110 and prevent contamination of the quadrupoles 118 with ion deposits.

The system according to the illustrated embodiment may further include a detector 120 (e.g., ion detector). The detector 120 may be one or more of many types of detectors such as a Faraday cup, an electron multiplier or a photo-multiplier detector. In the illustrated embodiment, the detector 120 is a photomultiplier detector. Shown better in FIG. 2, the detector 120 may include a conversion dynode 122 and phosphor plate 124. Generally ions emerging from the mass separator 110 will strike the dynode 122 resulting in electrons being emitted towards the phosphor plate 124. Electrons striking the phosphor plate 124 are converted into photons. The photons are then amplified via a photomultiplier 126 (e.g., at a gain of $10^5$) and evaluated. As one of ordinary skill in the art will understand, the detector 120 may include additional components as required to identify and/or quantitate compounds. Further, the detector 120 may include a communication link to transmit detection data to a computer and/or user interface.

Figure 2:
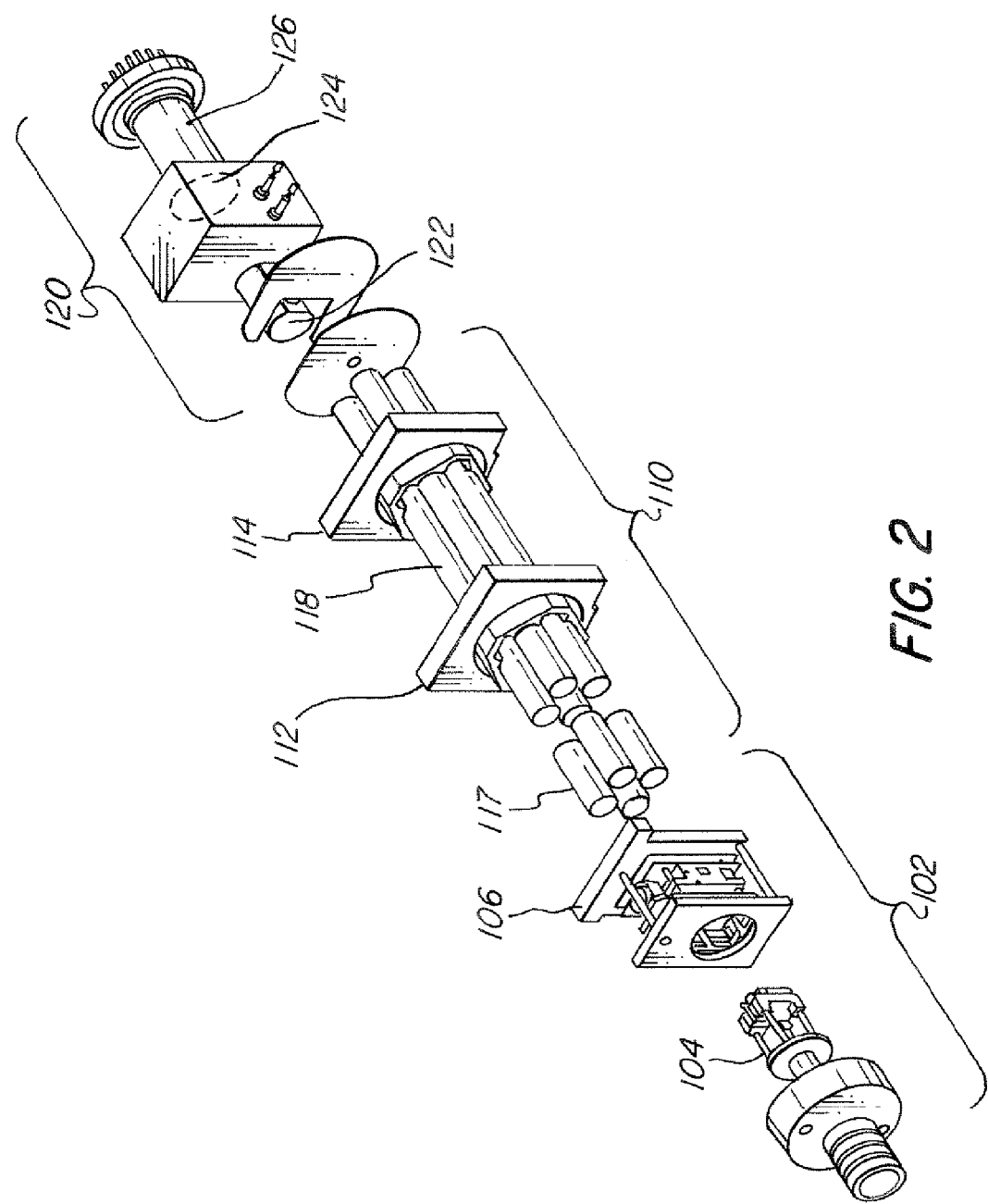
FIG. 2 is a perspective view of an ion optics portion of an ion optical system according to FIG. 1.
Figure 3:
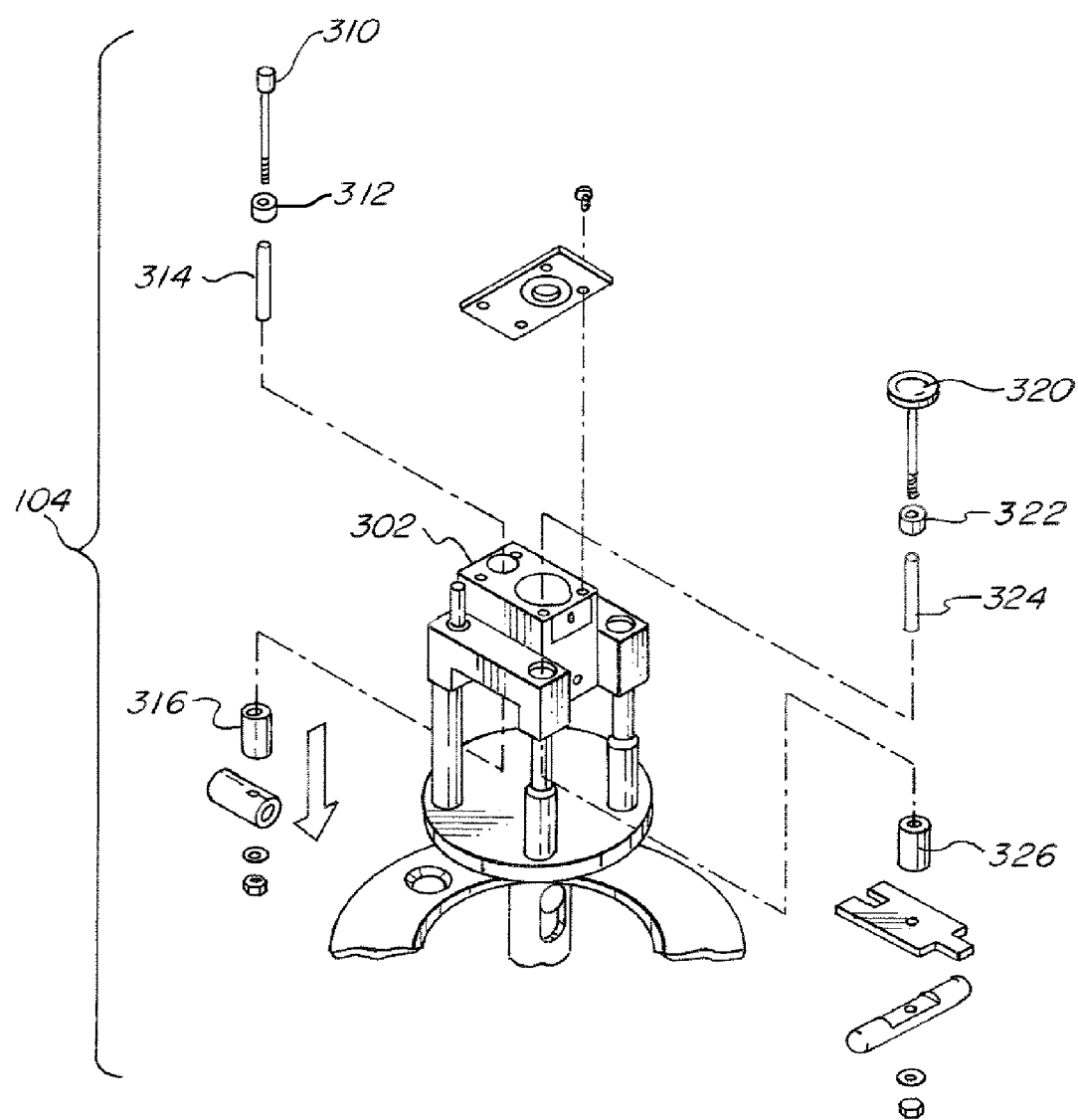
FIG. 3 is an exploded view of an inner ion source of an ion optical system according to FIG. 1.

Also shown in FIG. 2, the ionizer 102 may include two or more portions. For example, the ionizer 102 may include an inner ion source 104 and an outer ion source 106. FIG. 3 is an exploded view of the inner ion source 104. The inner ion source 104 includes many components and/or sub-components which require high temperature capability, strength, fracture toughness, chemical inertness, and high temperature electrical insulation/isolation. For example, the inner ion source 104 includes a housing 302 supporting an electron trap 310 and repeller 320. As one of ordinary skill in the art will understand, the electron trap 310 attracts negative ions and electrons to the repeller 320 which then directs the ions out of the inner ion source 104 and to the mass separator 110. The electron trap 310 and repeller 320 may further include several spacers (e.g., 2 mm, 6 mm, 12 mm spacers). For example, the inner ion source 104 may include spacers 312, 314, 316 and spacers 322, 324, 326.

To meet the high temperature, inertness, and insulation requirements and exceed the capability of known mass spectrometer systems, some of the above described components of the inner ion source 104 comprise an optimized composition of zirconium oxide ($ZrO_2$) and aluminum oxide ($Al_2O_3$) or zirconia toughened alumina ("ZTA"). For example, a composition including approximately 5% to approximately 60% of zirconium oxide by volume may be used. For example, in embodiments, the composition comprises at least approximately 5% zirconium oxide by volume, while in other embodiments, the composition comprises at least approximately 20% zirconium oxide by volume, while in yet further embodiments, the composition comprises at least approximately 50% zirconium oxide by volume. In an embodiment, the composition includes approximately 50% aluminum oxide by volume and approximately 50% zirconium oxide by volume. In an embodiment, the composition comprises approximately 70% aluminum oxide by volume and approximately 30% zirconium oxide by volume. In embodiments, the compositions can provide increased strength over presently used ceramics while providing electrical insulative properties up to at least 350° C.

As one of ordinary skill in the art will understand, spacers may be used in part to electrically isolate particular components such as the electron trap 310 and/or repeller 320. As such, any one or all of the spacers 312-316 and 322-326 according to the present invention may comprise the composition of zirconium oxide and aluminum oxide. Some spacers may comprise the composition consisting essentially of approximately 70% aluminum oxide by volume and approximately 30% zirconium oxide by volume. Further, some spacers that require additional electrical insulation but less fracture toughness and strength may comprise the composition consisting essentially of approximately 80% aluminum oxide by volume and approximately 20% zirconium oxide by volume. Spacers comprising this particular composition may maintain greater than $1 \times 10^{12}$ Ohms of resistance at 350° C.

It should be noted that the inner ion source 104 according to the illustrated embodiment may also employ chemical ionization, either alone or in combination with the above described electron ionization. Such a chemical ionizer (not shown) may not include the electron trap 310 and repeller 320. However, any number of ZTA spacers would likewise be used to electrically isolate components thereof.

Figure 4:
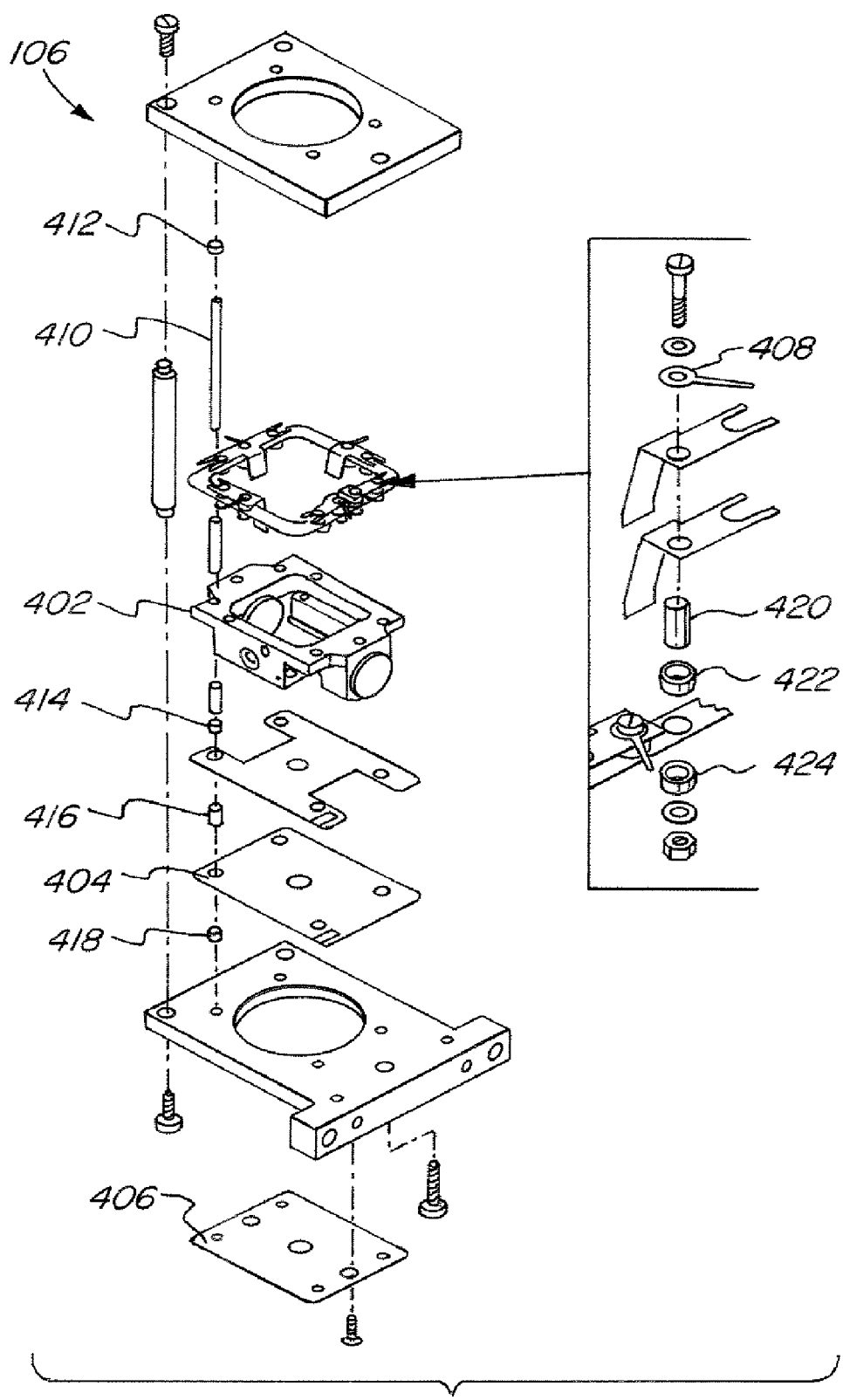
FIG. 4 is an exploded view of an outer ion source of an ion optical system according to FIG. 1.

FIG. 4 shows one outer ion source 106 for an ion optical system according to the illustrated embodiment. As one of ordinary skill in the art will understand, the outer ion source 106 may include numerous components such as an ion block 402, one or more lenses 404/406, and one or more contact terminals 408. The outer source 106 may also include one or more heaters (shown in FIG. 5) to raise the source temperature high enough to prevent molecules in the sample from condensing. Further included in the outer ion source 106 may be several (e.g., four or more) structural rods 410 for supporting and/or aligning the outer ion source 106. The outer ion source 106 also includes any number of spacers for isolating and/or separating various portions or components of the outer ion source 106.

Any one or several of the components of the outer ion source 106 may also comprise a composition of zirconium oxide and aluminum oxide as described above, e.g., to provide improved structural strength and electrical insulation, higher temperature capability, and improved chemical inertness. For example, the structural rods 410 may comprise the composition, e.g., consisting essentially of approximately 70% aluminum oxide by volume and approximately 30% zirconium oxide by volume. The rods 410 according to the illustrated embodiment therefore provide chemically inert support for the outer ion source 106 with high electrical insulation properties. The rods 410 according to the illustrated embodiment thus may be less prone to breakage and intermittent shorts as is prevalent in the prior art systems.

As shown in FIG. 4, the outer ion source 106 further includes numerous spacers, e.g., spacers 412-424. Any one or several of the spacers may also be made from a composition of zirconium oxide and aluminum oxide. The use of spacers comprising such composition in the outer ion source 106 provides superior performance (e.g., electrical isolation performance) and allows the spacers to resist breaking under thermal expansion.

Figure 5:
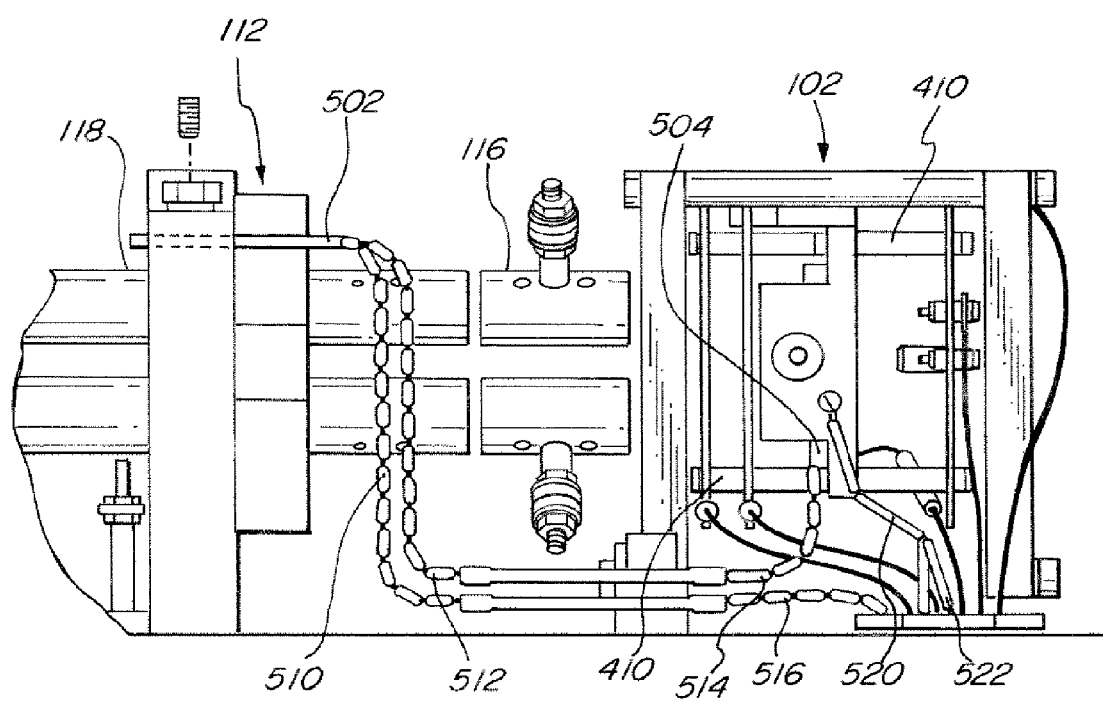
FIG. 5 is another side view of an ion optical system according to FIG. 1.

FIG. 5 shows a side view of a portion of the ion optical system and, in particular, the ionizer 102. One of the supports 112/114 of the mass separator 110 is also shown. As one of ordinary skill in the art will understand, the mass separator 110 is a finely machined assembly which must be precisely aligned and supported. It is desired that the supports 112/114 maintain the required alignment, withstand high temperature and contact with any number of chemical compounds, and act as an electrical isolator. Therefore, in the illustrated embodiment, the supports 112/114 comprise an above described composition of zirconium oxide and aluminum oxide. For example, the supports 112/114, or the portions of which are in contact with the quadrupoles, may consist essentially of approximately 70% aluminum oxide by volume and approximately 30% zirconium oxide by volume. In some other embodiments, the supports 112/114 include a composition of approximately 50% aluminum oxide by volume and approximately 50% zirconium oxide by volume.

Figure 6A:
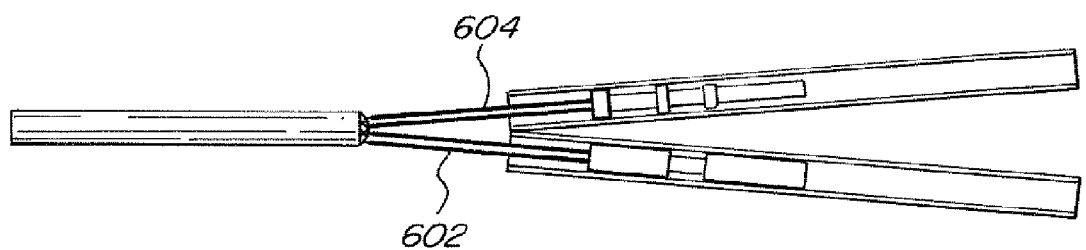
FIG. 6A is a cutaway view of electrical connector of an ion optical system according to FIGS. 1 and 5.
Figure 6B:
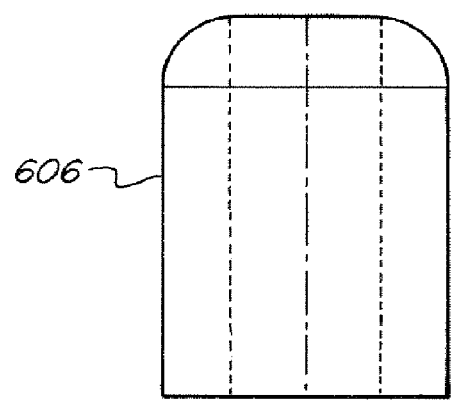
FIG. 6B is a cutaway view of electrical bead of an ion optical system according to FIGS. 1 and 5.

Also shown in FIG. 5, the system according to the illustrated embodiment may include different numbers of heaters, or heater cartridges 502 and 504, for providing heat to the quadrupoles 118 and/or ionizer 102. The wiring for the heater cartridges, as well as for other components of the system, generally requires an isolator means to provide wire mobility, insulation and electrical isolation. In the illustrated embodiment, the system therefore includes one or more beads, such as beads 510-516 and 520-522. As shown, multiple beads may be employed in series, e.g., on a heater lead or other wire of the system. FIGS. 6A and 6B show additional exemplary beads 602-606 according the illustrated embodiment. The beads comprise a composition of zirconium oxide and aluminum oxide as disclosed herein to provide insulation/isolation without being prone to breakage. For example, a composition including approximately 5% to approximately 60% of zirconium oxide by volume may be used. In one embodiment, the composition includes approximately 80% aluminum oxide by volume and approximately 20% zirconium oxide by volume. Therefore, the beads according to the present teachings can prevent the wiring from contacting with other components of the system which may lead to electrical shorts or other serious malfunctions of the system.

Although the invention has been described with reference to a particular arrangement of parts, features and the like, these are not intended to exhaust all possible arrangements or features, and indeed many modifications and variations will be ascertainable to those of skill in the art.

What is claimed is:

1. An ion optical system, comprising:
   an ionizer for ionizing one or more compounds, said ionizer comprising a plurality of components;
   a mass separator for separating ions of the one or more compounds, said mass separator comprising a plurality of components; and
   a detector for identifying the one or more compounds, said detector comprising a plurality of components,
   wherein at least one of the plurality of components of at least one of said ionizer, said mass separator and said detector comprises a composition of zirconium oxide and aluminum oxide.

2. The ion optical system according to claim 1, wherein the composition includes at least approximately 5% zirconium oxide by volume.

3. The ion optical system according to claim 1, wherein the composition includes at least approximately 20% zirconium oxide by volume.

4. The ion optical system according to claim 1, wherein the composition includes at least approximately 50% zirconium oxide by volume.

5. The ion optical system according to claim 1, wherein the composition consists essentially of approximately 30% zirconium oxide by volume and approximately 70% aluminum oxide by volume.

6. The ion optical system according to claim 1, wherein the composition consists essentially of approximately 50% zirconium oxide by volume and approximately 50% aluminum oxide by volume.

7. The ion optical system according to claim 1, wherein the at least one component is a spacer for electrically isolating one or more other components.

8. The ion optical system according to claim 1, wherein the at least one component is a structural rod of the ionizer.

9. The ion optical system according to claim 1, wherein the at least one component is a support of one or more quadrupoles of the mass separator.

10. The ion optical system according to claim 1, wherein the at least one component is an insulator bead.

11. An ion optical system, comprising:
    an ionizer for ionizing one or more compounds, said ionizer comprising at least one structural rod, at least one spacer, and at least one bead;
    a mass separator for separating ions of the one or more compounds, said mass separator comprising at least four quadrupoles and at least one support for the quadrupoles; and a detector for identifying the one or more compounds;
wherein at least one of the at least one structural rod, at least one spacer, at least one bead, and at least one support comprises a composition of zirconium oxide and aluminum oxide.

12. The ion optical system according to claim 11, wherein the composition includes at least approximately 5% zirconium oxide by volume.

13. The ion optical system according to claim 11, wherein the composition includes at least approximately 20% zirconium oxide by volume.

14. The ion optical system according to claim 11, wherein the composition includes at least approximately 50% zirconium oxide by volume.

15. The ion optical system according to claim 11, wherein the composition consists essentially of approximately 30% zirconium oxide by volume and approximately 70% aluminum oxide by volume.

16. The ion optical system according to claim 11, wherein the composition consists essentially of approximately 50% zirconium oxide by volume and approximately 50% aluminum oxide by volume.

17. A method of isolating one or more components of ion optical system, comprising the steps of:

providing an ionizer for ionizing one or more compounds, said ionizer comprising a plurality of components;

providing a mass separator for separating ions of the one or more compounds, said mass separator comprising a plurality of components;

providing a detector for identifying the one or more compounds, said detector comprising a plurality of components; and providing at least one isolator comprising a composition of zirconium oxide and aluminum oxide for at least one of the plurality of components of at least one of said ionizer, said mass separator and said detector.

18. The method according to claim 17, wherein the composition includes at least approximately 20% zirconium oxide by volume.

19. The method according to claim 17, wherein the composition consists essentially of approximately 30% zirconium oxide by volume and approximately 70% aluminum oxide by volume.

20. The method according to claim 17, wherein said isolator comprises at least one of a spacer, a bead and a support.

* * * * *